United States Patent [19]

Chopko et al.

[11] Patent Number: 5,388,424
[45] Date of Patent: Feb. 14, 1995

[54] COMPOSITE COVER FOR TRANSPORT REFRIGERATION UNIT

[75] Inventors: Robert A. Chopko, Baldwinsville; Robert S. Simeone, Bridgeport, both of N.Y.

[73] Assignee: Carrier Corporation, Syracuse, N.Y.

[21] Appl. No.: 98,495

[22] Filed: Jul. 27, 1993

[51] Int. Cl.⁶ .............................................. B60H 1/32
[52] U.S. Cl. ......................................... 62/239; 49/381
[58] Field of Search ...................... 62/239; 49/381, 501

[56] References Cited

U.S. PATENT DOCUMENTS

| | | | |
|---|---|---|---|
| 3,950,894 | 4/1976 | DiMaio | 49/501 |
| 3,967,671 | 7/1976 | Stanley et al. | 49/501 X |
| 4,078,395 | 3/1978 | Crowe et al. | 62/239 |
| 4,365,484 | 12/1982 | Carson et al. | 62/239 |
| 4,722,199 | 2/1988 | Hibino | 49/501 X |
| 5,022,206 | 6/1991 | Schield | 49/501 X |
| 5,193,310 | 3/1993 | Kiel | 49/501 |

Primary Examiner—William E. Tapolcai

[57] ABSTRACT

According to the present invention a transport refrigeration unit of the type adapted to be mounted on the front wall of and for conditioning the interior of a trailer is provided with a front cover adapted to be attached to a structural framework of the refrigeration unit. The cover includes a plurality of sections formed from a single thickness of polyethylene and also includes a plurality of sections formed from a composite structure. According to a preferred embodiment the composite structure is a twin sheet structure filled with a polyurethane foam. The composite structures comprise doors which are adapted to be hingedly mounted to the refrigeration unit. The hinges are attached to the composite structure by a combination of an interior and exterior support plate arrangement whereby one skin of the twin sheet structure is sandwiched between the plates.

5 Claims, 4 Drawing Sheets

COMPOSITE COVER FOR TRANSPORT REFRIGERATION UNIT

BACKGROUND OF THE INVENTION

1. Field of the Invention

The present invention relates generally to the art of transport refrigeration units and in particular to outer protective covers for such units.

2. Description of the Prior Art

A typical transport refrigeration unit of the type designed for mounting on the front face of a tractor trailer unit comprises a one piece, self-contained fully refrigerant charged, prewired, refrigerant/heating unit powered by a diesel engine. In such a design the evaporator fits into a rectangular opening in the upper portion of the trailer front wall. When installed, the evaporator section is located inside the trailer; and the condensing section is outside and on the front of the trailer. The condensing section consists of an engine-compressor drive package, condenser fan, condenser coil, radiator coil, control panel, relay module, refrigerant controls, piping, wiring and associated components.

Structural frame means support all of the components and facilitate attaching of the unit to the trailer front face. Also supported by the structural framework is an outer cover which includes the necessary air inlet and outlet openings for cooling, and which may be opened to provide access to the interior of the unit for maintenance and service.

Such refrigeration units should be able to be manufactured without undue difficulty, should be as light in weight as possible while having adequate structural strength and should provide adequate refrigerant capacity for their intended service.

Looking now to the outer cover of such units it is considered desirable to provide components which are lower in cost and weight while at the same time displaying improved quality, appearance and reliability. It is also desirable to provide such components which are made from fewer parts thus facilitating handling at assembly.

SUMMARY OF THE INVENTION

According to the present invention a transport refrigeration unit of the type adapted to be mounted on the front wall of and for conditioning the interior of a trailer is provided with a front cover adapted to be attached to a structural framework of the refrigeration unit. The cover includes a plurality of sections formed from a single thickness of polyethylene and also includes a plurality of sections formed from a composite structure. According to a preferred embodiment the composite structure is a twin sheet structure filled with a polyurethane foam. The composite structures comprise doors which are adapted to be hingedly mounted to the refrigeration unit. The hinges are attached to the composite structure by a combination of an interior and exterior support plate arrangement whereby one skin of the twin sheet structure is sandwiched between the plates.

BRIEF DESCRIPTION OF THE DRAWINGS

The novel features that are considered characteristic of the invention are set forth with particularly in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DETAILED DESCRIPTION OF THE PREFERRED EMBODIMENT

Figure 1:
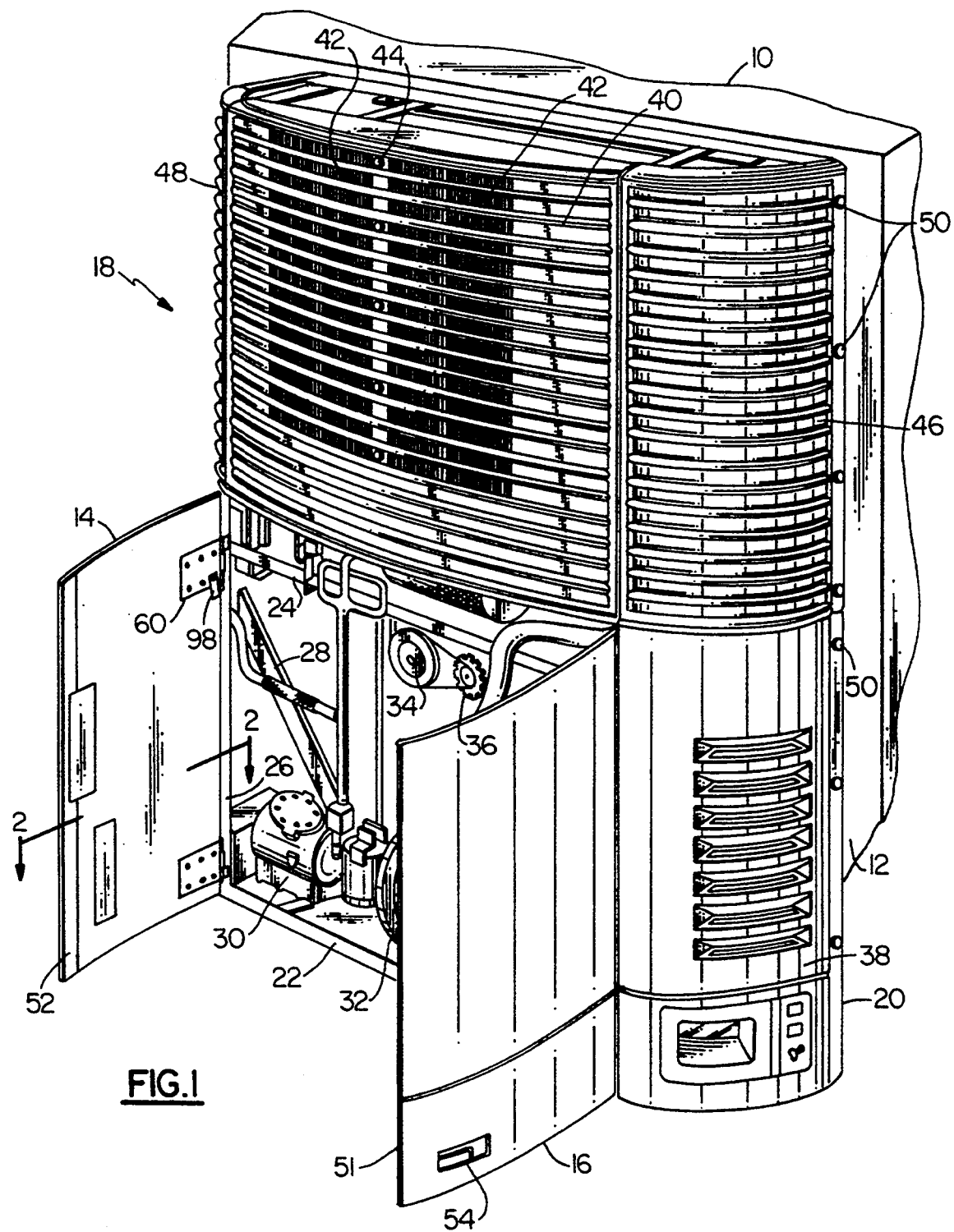
FIG. 1 is a perspective view of a transport refrigeration unit, having the front doors thereof open, the doors being fabricated according to the present invention.

In FIG. 1 a fragmentary front part of a large transport trailer 10 is shown with a transport refrigeration unit 18 according to the invention shown mounted on the front wall 12 of the trailer. For purposes of the present description the terms "roadside" and "curbside" will be used in describing various components of the refrigeration unit and its cover. As viewed in FIG. 1, the right hand side of the unit will be referred to as the roadside and the left hand side of the unit as the curbside of the unit.

With this reference, the unit as illustrated in FIG. 1 has the inner curbside door 14, and, the inner roadside door 16 of the unit cover in their open position to illustrate the inner structural components of the unit as well as some of the components of the refrigeration unit itself. Attachment of the refrigeration unit 18 to the trailer 10 is carried out by connection of an outer peripheral planar structural steel framework illustrated generally by reference numeral 20. It should be appreciated that this framework is not normally visible when the unit is properly installed on a trailer unit, however for purposes of illustration, at least a portion of the structural framework is illustrated in FIG. 1. The framework includes other appropriate structural members as illustrated, for example, by lower and mid-level horizontal members 22 and 24 which are spaced forwardly from the front wall of the trailer unit. Vertically extending structural members 26 (only one of which is shown in FIG. 1) are also spaced from the front wall and interconnect with the horizontal members 22 and 24 as well as with appropriate diagonally extending structural frame elements 28.

Several of the internal components of the refrigeration system are simply shown in FIG. 1 including the compressor 30, the engine fly wheel housing 32, a portion of a clutch and gear box assembly 34 and the alternator 36.

All of the component assemblies which define the outer cover of the refrigeration unit 18 are mounted to the various structural components described hereinabove. Each of the doors forming the lower portion of the cover are made from a tough, light-weight composite material designed to resist rust, denting, warping, fading or peeling of their outer finish. Their construction will be described in more detail hereinbelow. These components include the inner curbside door 14 and the inner roadside door 16 previously referred to above. They also include the outer roadside door 38 and the outer curbside door (not shown). The outer roadside door 38 is provided with louvered openings 39 to permit good airflow to the radiator of the units diesel engine which is located directly behind it.

As is evident from FIG. 1, the inner doors 14 and 16 are vertically hinged at their respective outer edges to provide a large access opening at the front of the unit. The outer roadside door 38 is vertically hinged at its inner edge such that it pivots about substantially the same axis as the inner roadside door 16. The attachment of the hinges to the composite doors and to the vertical structural members 26 to which they are attached will be described in detail hereinbelow.

The upper part of the unit cover comprises three grille panels. Each of these panels are formed from a single thickness of polyethylene to have a simulated louver-like ornamental outer surface. The front grille member 40 is positioned in overlying relationship with the condenser heat exchanger of the refrigeration unit and is provided with a large number of openings 42 therethrough to facilitate air flow for efficient heat transfer. The front grille is fastened to the vertically extending structural members 26 by appropriate fastening means as at 44.

The roadside grille section 46 and the curbside grille section 48 are both vertically hinged at their respective inner edges to one of the vertically extending structural elements 26. The attachment of the hinges to the grilles 46 and 48 is conventional. The outer edges of each of the curbside and roadside grilles 46 and 48 are fastened to a vertically extending portion of the structural frame 20 by suitable releasable connectors such as threaded thumb screws as illustrated at reference numeral 50.

It will be appreciated therefore that the door and grille components described above are designed to cooperate to fully enclose the refrigeration unit 18 to provide protection from the environment and road hazards and to aerodynamically and aesthetically enhance the unit. When closed, as described, the front grille is permanently attached to the unit while the roadside grille and the curbside grille 46 and 48 are hinged in a conventional manner and are attached by the thumb screws 50. The outer curbside door and the outer roadside door are closed and secured in the same manner. The inner curbside door 14 and the inner roadside door 16 as indicated, are hinged on their outer edges and designed to close in an overlapping fashion. The curbside door is designed to be closed first and the free edge 51 of the roadside door is received in a recess 52 in the free edge of the curbside door 14. As thus closed, a suitable latch mechanism (not shown) which is actuated by a handle 54 located near the bottom of the roadside door 16 secures the doors in place. The latch mechanism may be of the type shown and described in U.S. Pat. No. 4,660,872 - LATCH - to Carson et al. and assigned to the assignee of the present invention.

Figure 2:
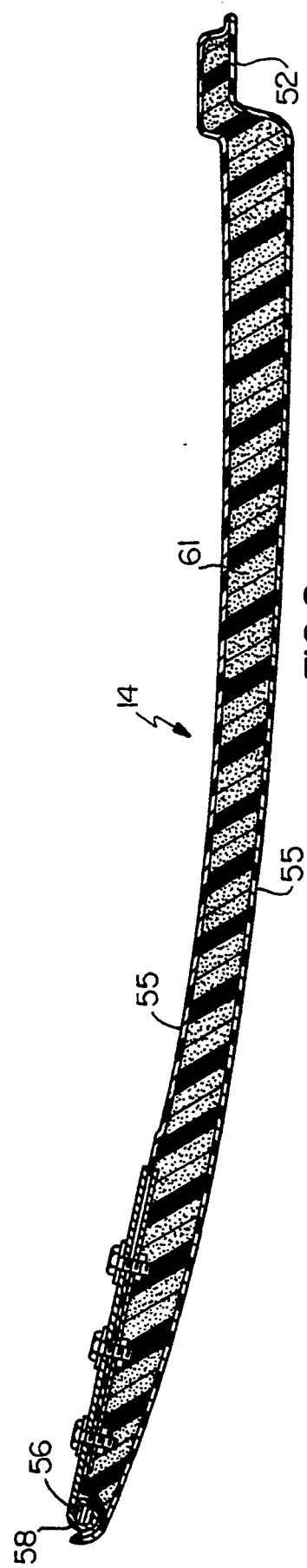
FIG. 2 is a sectional view taken along the line 2—2 of FIG. 1.

Looking now at the details of the composite doors, FIG. 2 shows a cross section taken through the inner curbside door 14. As previously indicated, the door is fabricated from a twin sheet formed, foam filled construction wherein the outer "skins" 55 of the doors have been formed from acrylonitrile butadiene styrene (ABS) and are filled with a polyurethane foam 61. Construction of such composite panels is well known in the art and will not be elaborated upon herein. It will be noted with reference to FIG. 2 that the right hand end of the door contains the recess 52 designed to engage with the free end of the roadside door when the doors are closed as described above. The left hand side of FIG. 2 illustrates the manner of attaching the structural hinge support according to the present invention. This feature of the invention will be described in connection with the attachment of the illustrated hinge plate but it should be understood it is readily adaptable to the attachment of other structural support members to such a composite panel.

Referring now to FIGS. 2 through 5, it will be noted that the hinge pin 56 is supported by a pin receiving section 58 encircling the pin. This section is an extension of a large hinge plate 60. The hinge plate 60 is positioned in overlying relationship with the outer surface of the inner skin 55 of the door 14. It will be noted that an inner hinge support plate 62 is positioned within the interior of the composite structure in confronting relationship with hinge plate 60 on the inner side of the inner skin 55 of the door. As will be seen, threaded bolts 76 extend through the hinge plate 60, the inner skin 55 of the door and the inner plate 62 in order to sandwich and interconnect these components in a high structural integrity relationship for supporting the hinge pin.

Figure 3:
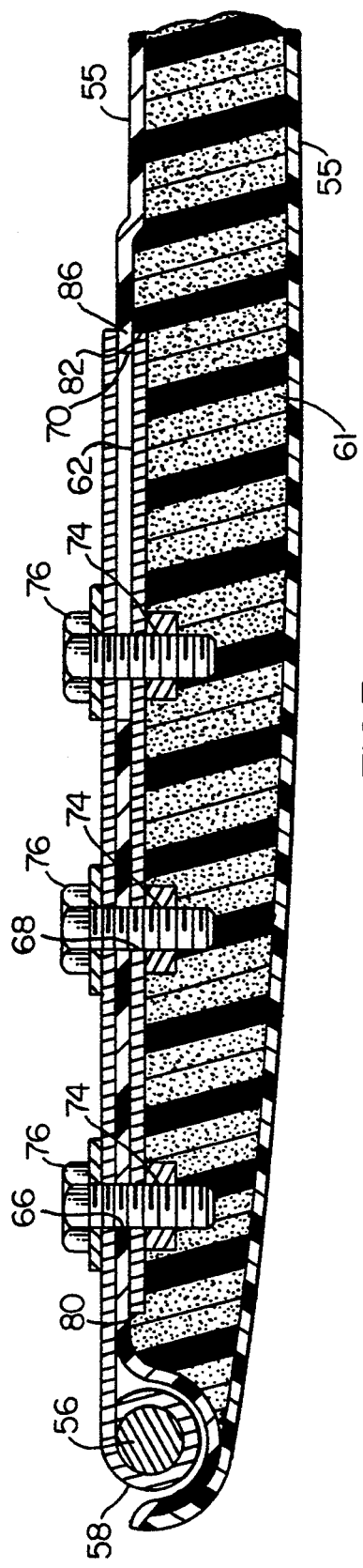
FIG. 3 is an enlarged view of the left hand end of the door of FIG. 2.
Figure 5:
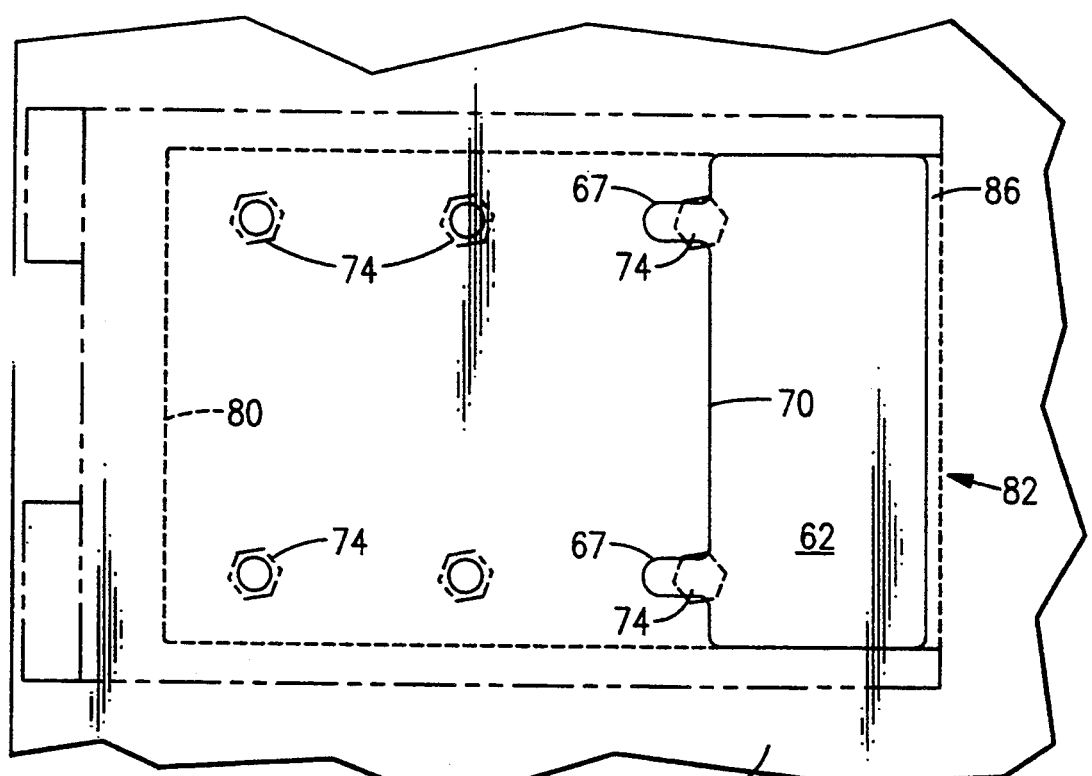
FIG. 5 is an enlarged view of the interior of a door of the unit of FIG. 1 illustrating the mounting of the hinge plate thereupon.

With reference to FIGS. 3 and 5 particularly, the manner of assembling the hinge support structure will be described. Following the assembly of the inner and outer skins 55 of the composite structure, but before filling the structure with structural foam, holes 66 are drilled in the inner skin 55 for receiving the bolts 76. Adjacent one end of the inner skin 55 which will be sandwiched by the hinge support plates 60 and 62, a rectangular opening 70 is cut. This opening is large enough to allow the inner hinge support plate 62 to be inserted therethrough. This opening communicates with the pair of openings 66 in the skin 55 adjacent one end of the hinge support structure to define slots 67.

The inner plate 62 is provided with holes 68 in alignment with the holes 66 drilled in the skin 55 of the composite panel. In each of these holes 68 a threaded "clinch nut" 74 is preattached to the inner plate 62. A threaded bolt 76 is prethreaded into each of the nuts 74 attached to one end of the inner plate 62. As thus assembled, one end 80 of the inner plate 62 is inserted through the rectangular opening 70 into the interior of the composite structure and the pair of preassembled threaded bolts are slid into engagement with the slots 67. The length of the slots 67 is such that the threaded bolts 76 will move past their final assembled position a sufficient distance to allow the other end 82 of the inner plate to pass into the opening 70. As a result the entire inner plate is then within the interior of the composite structure. The inner plate 62 is then moved longitudinally with respect to the rectangular opening such that the inner plate overlaps at least a portion of the composite skin 55 on both ends as illustrated in FIGS. 3 and 5 at 86.

The threaded nuts 74 in the inner plate 62 are then properly aligned with the other openings 66 in the composite skin 55 and the threaded fasteners 76 are turned in order to clamp the inner plate 62 in its desired location. At this point, with the inner plate 62 so supported, the interior of the composite structure is foamed by introducing the foam into the inner cavity in a conventional fashion. Following curing of the foam the inner plate 62 and the threaded nuts 74 carried by it are supported within the completed composite structure in precise position for proper alignment and attachment of the outer hinge plate 60 by engagement of the other threaded fasteners 76 to form the completed assembly as shown in detail in FIG. 3.

It should be appreciated that this method of attaching a structural support element to a composite panel may readily lend itself to the attachment of other structural components to such panels in a blind fashion wherein there is no evidence of support from the outside or the other side of the panel. Such method is used in the cover of the present invention for supporting the aforementioned latch structure to the back of the inner roadside door 16.

Figure 4:
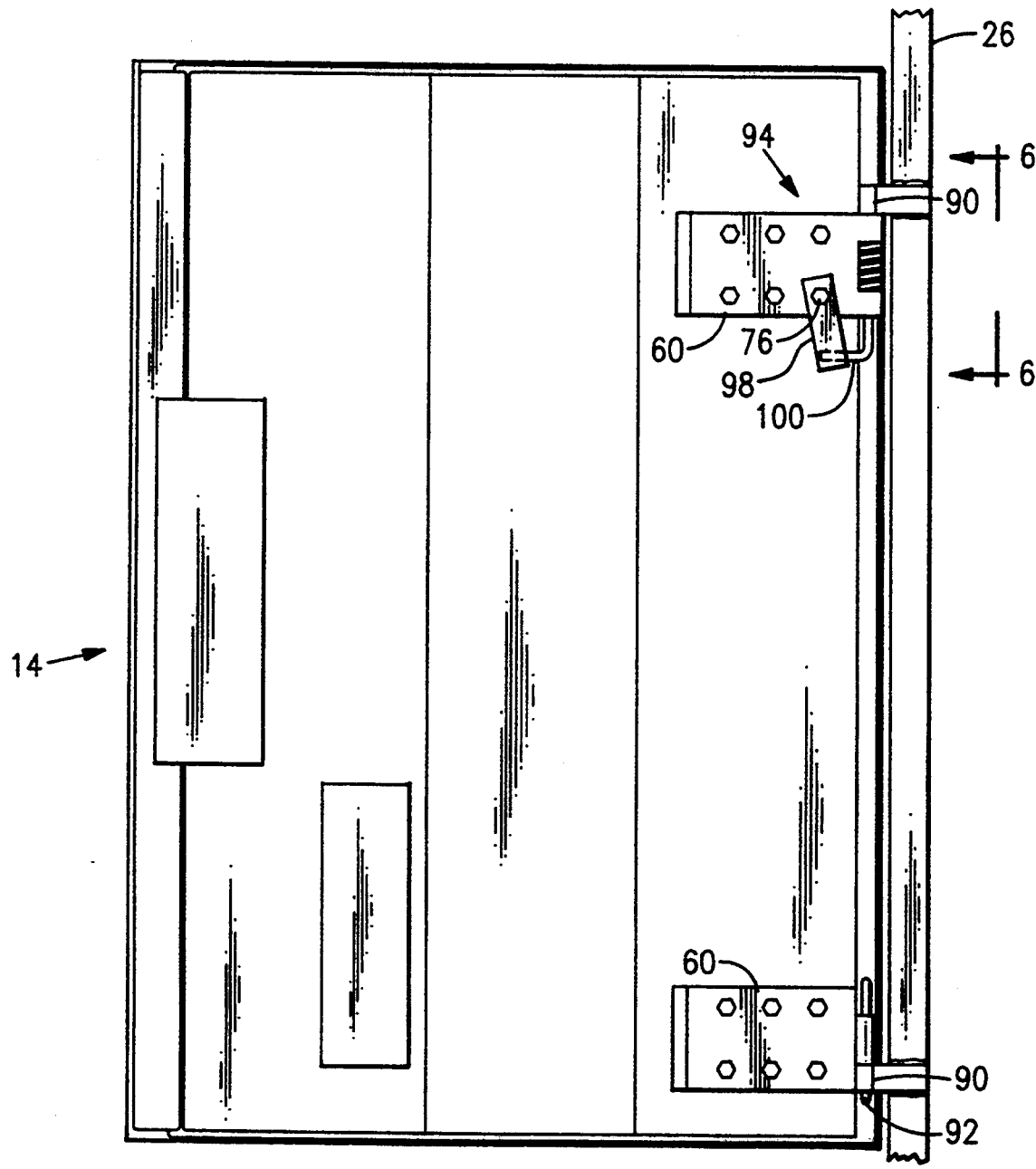
FIG. 4 is an enlarged interior view of the left hand door of the unit illustrated in FIG. 1.
Figure 7:
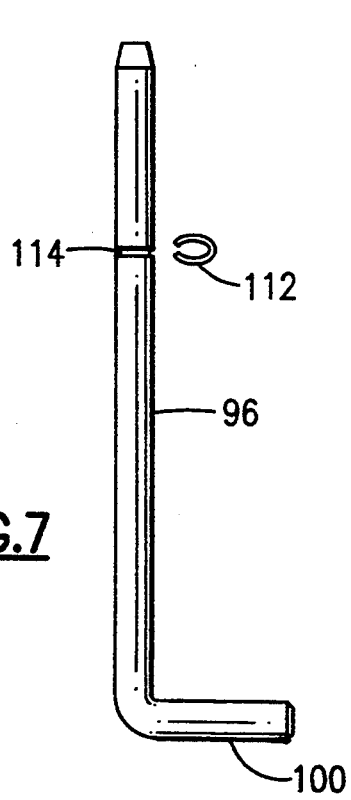
FIG. 7 is a detailed showing of the hinge pin of FIG. 6.
Figure 6:
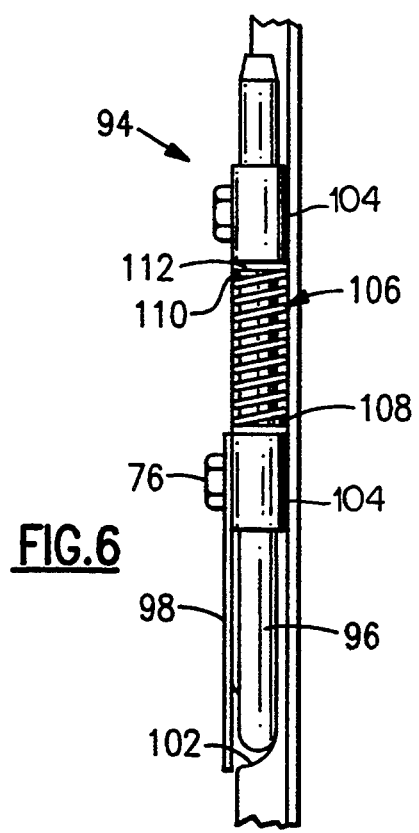
FIG. 6 is an enlarged sectional view of a hinge taken along the line 6—6 of FIG. 4.

Looking now at FIGS. 4, 6 and 7 the support arrangement for the inner doors 14 and 16 will be seen to provide a quick installation and removal of these doors by way of a spring-loaded, quick-release mechanism. The vertically extending support members 26 adjacent the hinges of each of the doors are each provided with appropriate hinge pin receiving receptacles 90. The lower receptacle underlies the lower hinge and is adapted to receive a downwardly extending hinge pin 92 carried by that hinge. The upper pin receptacle is in overlying relationship with the upper hinge to receive a movable spring-loaded hinge pin 96 carried by the upper mechanism 94.

It will be appreciated that, in order for the movable upper hinge pin 96 to move into engagement with the support structure 90 it is necessary that it be moved axially downwardly in order to align the pin 96 with the pin receiving receptacle 90. This is accomplished by loosening a pin retaining plate 98 attached to the hinge plate 60 by one of the attaching bolts 76. The remaining plate 98 is adapted to engage a dogleg lower end section 100 of the movable pin 96. The dogleg section is adapted to engage a recess 102 formed in the inner wall of the door to thereby restrain the pin from moving axially.

The movable upper hinge pin itself 96 is supported by a pair of pin supporting and guiding sections 104 which form an extension of the hinge plate 60. These pin supporting sections 104 are spaced from one another to leave an intermediate section of the hinge pin 96 which is not supported thereby. Surrounding the pin and contained within the space between the pin support sections 104 is a coil spring 106 which is supported therein in slight compression. The lower end 108 of the spring 106 rests against the upwardly facing surface of the lower support section 104 while the upper end of the spring 110 is supported by a snap ring fastener 112, as shown in FIG. 7, which is snapped in place in an appropriate circumferential groove 114 formed in the pin 96.

As described, it will be appreciated that the pin 96 is thus held in its pin support engaging position, as shown in the drawing Figures, by both the engagement with the recess 102 in the door and the retaining plate 98 as well as by the spring 106.

Accordingly, when it is desired to install a door on the support structure of a refrigeration unit the upper pin assembly is prepared by loosening the bolt 76 retaining the retaining plate 98. The plate is then swung out of engagement with the dogleg 100 thus allowing the pin to rotate out of engagement with the recess 102 formed in the door. At this time the lower hinge pin 90 may be first installed in the lower hinge pin support structure 92 and the upper end of the door swung into position. At this time the upper pin 96 is moved downwardly against the force of the spring 106 by pulling on the dogleg 100 thus allowing alignment of the pin 96 with the support structure 90. Release of the pin causes the spring force to move the pin into proper engagement with the support structure whereupon the installer simply rotates the dogleg 100 of the pin back into the support recess 102 of the door, moves the plate 98 into overlying engagement with the dogleg and tightens the support bolt. At this point the door has been securely, quickly installed and is supported in a positive vibration and rattle-free fashion with the spring biasing the pin in the upward engaged position.

Removal of the door for fast full access to the main compartment of the refrigeration unit is accomplished by reversing the above procedure.

What is claimed is:

1. A transport refrigeration unit of the type adapted to be mounted on the front wall of a trailer for conditioning the interior of the trailer, the unit having a structural frame which includes a section to be attached to the trailer, and vertically extending members spaced from the front of the trailer for supporting a front cover for enclosing the refrigeration unit, wherein the front cover comprises:

a plurality of sections formed from a composite structure which comprises a twin sheet structure filled with foam;

at least one of said sections formed from a composite structure comprising an openable door;

said door having a hinge means attached thereto on one edge thereof, for mounting said door for opening and closing thereof;

said hinge means comprising: a first support plate positioned within said composite structure adjacent an inside wall of one of said twin sheets; and an outer hinge support plate positioned on the outside wall of said same sheet structure; and, interconnecting means attaching said first support place and said outer hinge support plate structurally together to thereby sandwich said twin sheet section therebetween, and means attached to said outer hinge support plate carrying a hinging structure.

2. The apparatus of claim 1 wherein said twin sheets are made from Acrylonitrile Butadiene Styrene (ABS).

3. The apparatus of claim 2 wherein said foam is a polyurethane foam.

4. The apparatus of claim 1 further including a plurality of sections formed from a single thickness of polyethylene.

5. The apparatus of claim 4 wherein at least one section formed from polyethylene comprises a grille section having through openings therein to facilitate air flow therethrough.

* * * * *